United States Patent
Palle et al.

(10) Patent No.: US 12,522,573 B2
(45) Date of Patent: Jan. 13, 2026

(54) PROCESS FOR PREPARATION OF TAFAMIDIS AND SALTS THEREOF

(71) Applicant: Alivus Life Sciences Limited, Solapur (IN)

(72) Inventors: Venkata Raghavendra Charyulu Palle, Pune (IN); Suresh Mahadev Kadam, Thane (IN); Vishweshwar Peddy, Hyderabad (IN); Santosh Ramesh Badgujar, Dombivali-West (IN); Vinayak Kacheshwar Bhujade, Ahmednagar (IN); Yogesh Eknath Gagare, Dombivali (IN)

(73) Assignee: ALIVUS LIFE SCIENCES LIMITED, Solapur (IN)

( * ) Notice: Subject to any disclaimer, the term of this patent is extended or adjusted under 35 U.S.C. 154(b) by 384 days.

(21) Appl. No.: 18/032,601

(22) PCT Filed: Oct. 8, 2021

(86) PCT No.: PCT/IB2021/059237
§ 371 (c)(1),
(2) Date: Apr. 19, 2023

(87) PCT Pub. No.: WO2022/084790
PCT Pub. Date: Apr. 28, 2022

(65) Prior Publication Data
US 2023/0391737 A1   Dec. 7, 2023

(30) Foreign Application Priority Data

Oct. 19, 2020  (IN) .............................. 202021045429
Feb. 3, 2021  (IN) .............................. 202121004662
Mar. 19, 2021  (IN) .............................. 202121011884

(51) Int. Cl.
*C07D 263/57*   (2006.01)

(52) U.S. Cl.
CPC ........ *C07D 263/57* (2013.01); *C07B 2200/13* (2013.01)

(58) Field of Classification Search
CPC ........................ C07D 263/57; C07B 2200/13
See application file for complete search history.

(56) References Cited

FOREIGN PATENT DOCUMENTS

| WO | WO-2016038500 A1 | * | 3/2016 | ................ A61P 9/00 |
| WO | WO-2017190682 A1 | * | 11/2017 | ........... A61K 31/423 |
| WO | 2019175263 A1 | | 9/2019 | |

OTHER PUBLICATIONS

Mino R. Caira, "Crystalline Polymorphism of Organic Compounds", Topics in Current Chemistry, Jan. 1, 1998, pp. 163-208, vol. 198.

* cited by examiner

*Primary Examiner* — Joseph K McKane
*Assistant Examiner* — Meghan C Heasley
(74) *Attorney, Agent, or Firm* — Michael E. Carmen

(57) ABSTRACT

The present invention relates to process for preparation of crystalline Form 4 of tafamidis. The present invention also relates to salts of tafamidis and process of preparation of salts of tafamidis. The present invention also relates to process for preparation of an amorphous solid dispersion of tafamidis or salt thereof.

13 Claims, 6 Drawing Sheets

Glenmark Life Sciences Limited Figure 1
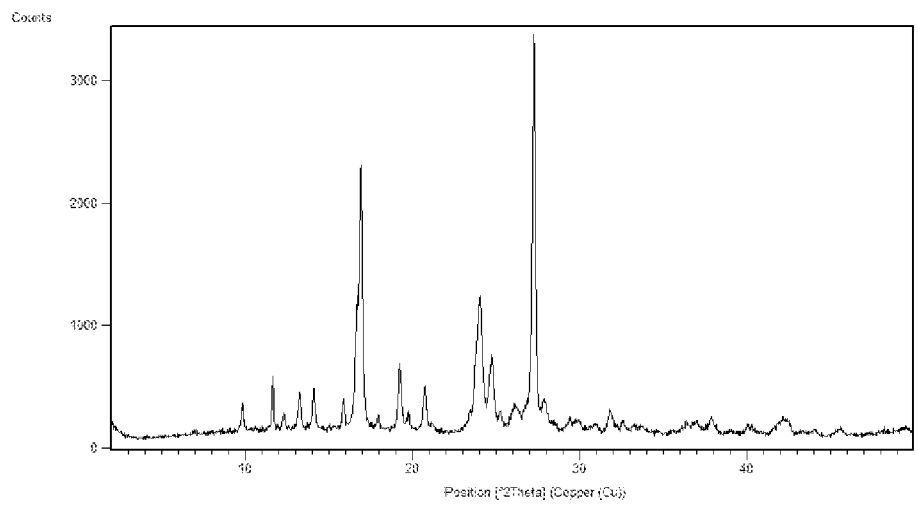
Glenmark Life Sciences Limited Figure 2
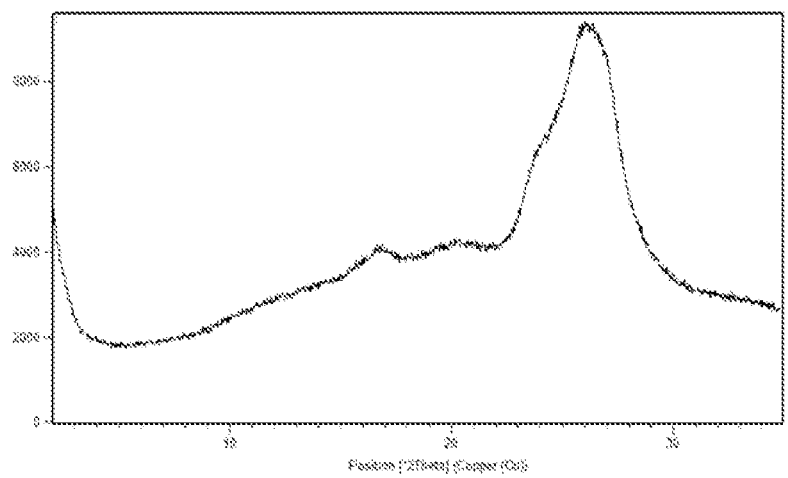

Glenmark Life Sciences Limited Figure 3
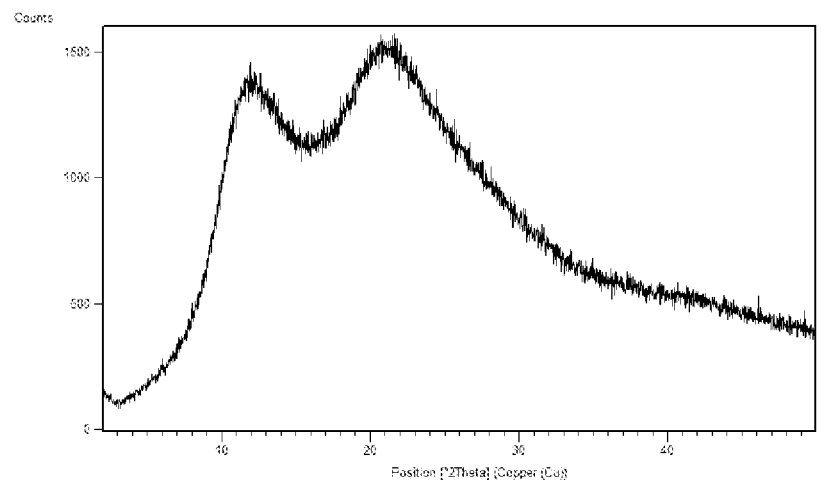
Glenmark Life Sciences Limited Figure 4
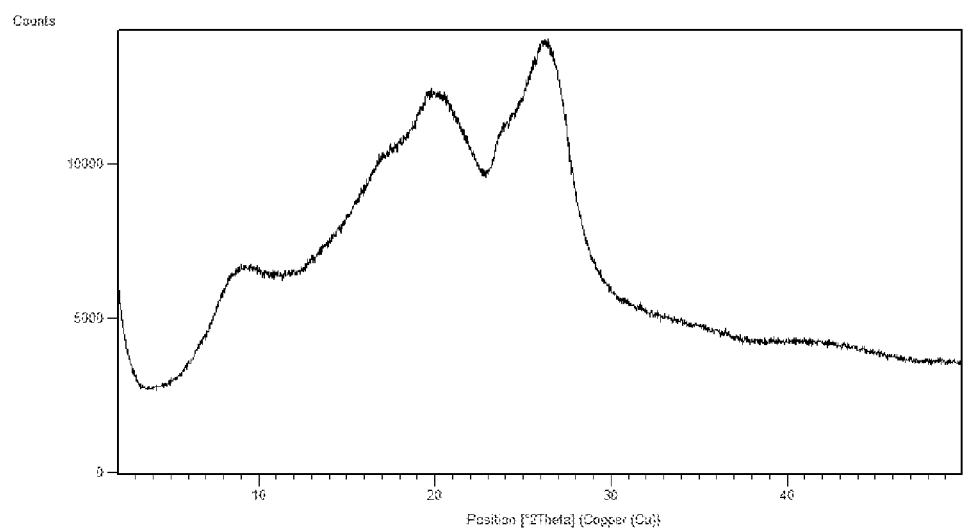

Glenmark Life Sciences Limited  Figure 5
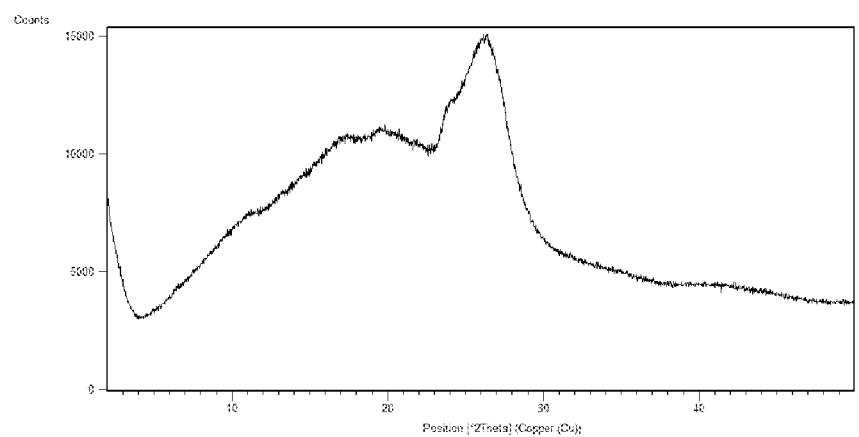
Glenmark Life Sciences Limited  Figure 6
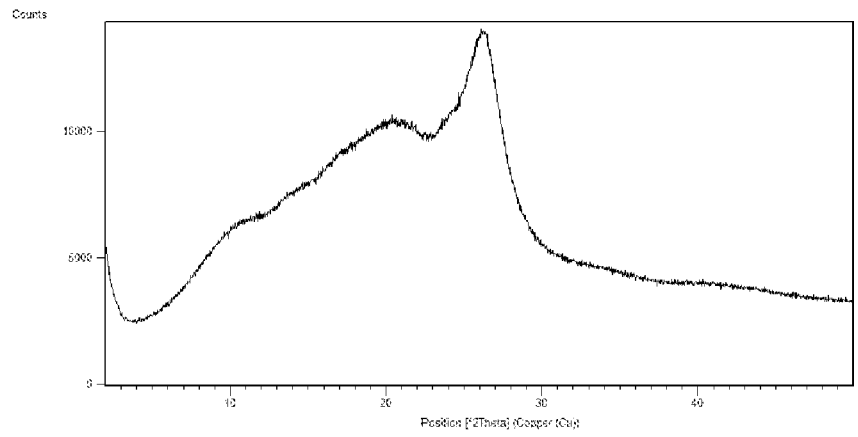

Glenmark Life Sciences Limited Figure 7
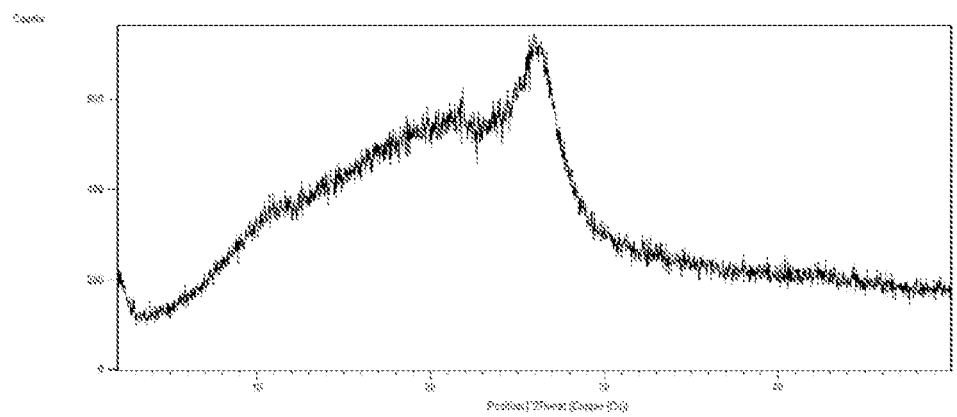
Glenmark Life Sciences Limited Figure 8
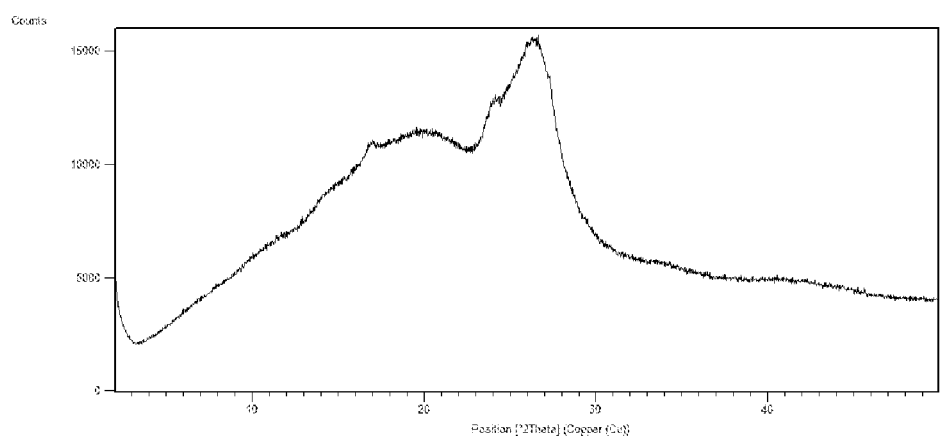

Glenmark Life Sciences Limited                                    Figure 9
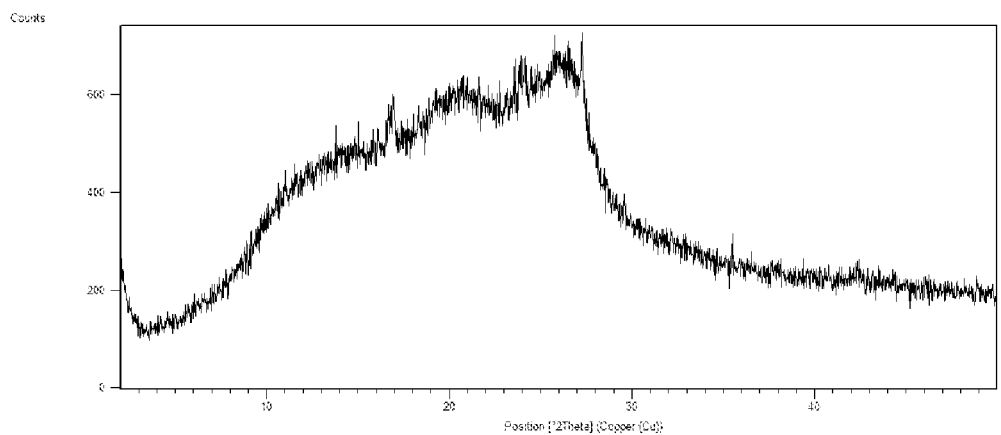
Glenmark Life Sciences Limited                                    Figure 10
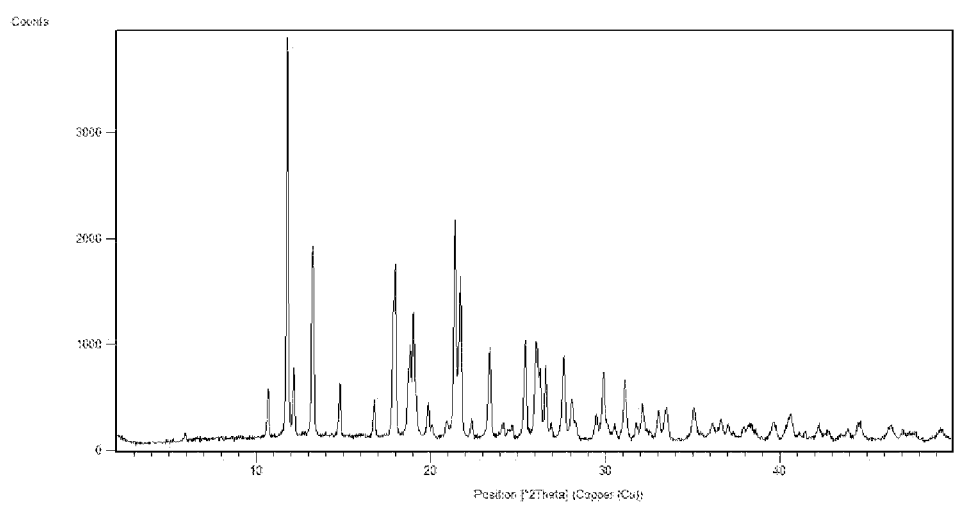

Glenmark Life Sciences Limited

PROCESS FOR PREPARATION OF TAFAMIDIS AND SALTS THEREOF

PRIORITY

This application claims priority under 35 U.S.C. § 371 to International Application No. PCT/IB2021/059237, filed Oct. 8, 2021, which claims the benefit of Indian Provisional Applications Nos. 202021045429 filed on Oct. 19, 2020, and entitled "SALTS OF TAFAMIDIS", 202121004662 filed on Feb. 3, 2021 and 202121011884 filed on Mar. 19, 2021, and entitled "PROCESS FOR PREPARATION OF TAFAMIDIS AND SALTS THEREOF", the contents of which are incorporated herein by reference.

BACKGROUND OF THE INVENTION

Technical Field

The present invention relates to process for the preparation of crystalline Form 4 of tafamidis. The present invention also relates to salts of tafamidis and process of preparation of salts of tafamidis.

Description of the Related Art

Tafamidis, also known as, 2-(3,5-dichlorophenyl)-1,3-benzoxazole-6-carboxylic acid is represented by the structure of formula II,

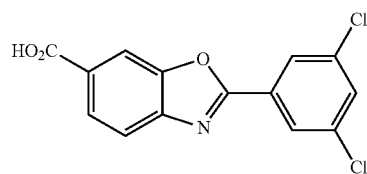

Tafamidis Meglumine, also known as, 2-(3,5-dichlorophenyl)-1,3-benzoxazole-6-carboxylic acid mono (1-deoxy-1-methylamino-D-glucitol) is represented by the structure of formula Ia,

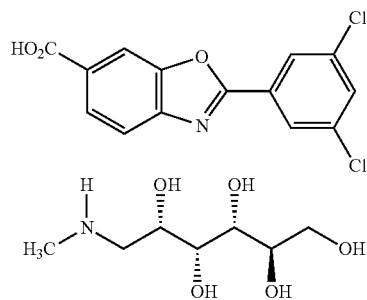

The object of the present invention is to provide a process for the preparation of crystalline Form 4 of tafamidis which is substantially free of crystalline Form 1 of tafamidis and other polymorphic forms of tafamidis.

SUMMARY OF THE INVENTION

In one embodiment, the present invention provides a process for the preparation of crystalline Form 4 of tafamidis, the process comprising:
(a) providing a solution of tafamidis in a solvent selected from the group consisting of $C_1$-$C_4$ amides, $C_2$-$C_3$ sulfoxides, $C_5$-$C_6$ pyrrolidones, and mixtures thereof;
(b) obtaining crystalline Form 4 of tafamidis from the solution of step (a) by
(i) combining the solution of step (a) with an anti-solvent selected from the group consisting of $C_1$-$C_8$ alcohols, $C_3$-$C_{10}$ ketones, $C_1$-$C_3$ nitriles, water and mixtures thereof; or
(ii) removing the solvent from the solution of step (a).

In one embodiment, the present invention provides a process for the preparation of crystalline Form 4 of tafamidis, the process comprising:
(a) reacting 4-(3,5-dichlorobenzamido)-3-hydroxybenzoic acid with a coupling agent in a solvent comprising amide solvent to obtain a reaction mixture comprising tafamidis;
(b) optionally, partially concentrating the reaction mixture of step (a);
(c) obtaining crystalline Form 4 of tafamidis from the reaction mixture of step (a) or step (b).

In one embodiment, the present invention provides salt of tafamidis, compound of formula I,

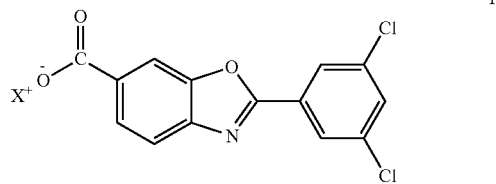

wherein X is cation capable of forming a salt selected from a metal element or organic base.

In one embodiment, the present invention provides a process for the preparation of salt of tafamidis comprising:
(a) reacting tafamidis with an inorganic or organic base to form a reaction mixture comprising the tafamidis salt; and
(b) separating the tafamidis salt from the reaction mixture.

In one embodiment, the present invention provides a process for the preparation of an amorphous solid dispersion of tafamidis or salt thereof together with at least one pharmaceutically acceptable carrier, the process comprising:
(a) providing a solution or mixture of tafamidis or salt thereof together with at least one pharmaceutically acceptable carrier in a solvent; and
(b) obtaining the amorphous solid dispersion of tafamidis or salt thereof together with at least one pharmaceutically acceptable carrier from the solution or mixture of step (a).

BRIEF DESCRIPTION OF THE DRAWINGS

FIG. 1 is a characteristic XRPD of crystalline Form 4 of tafamidis as obtained in Example 23.

FIG. 2 is a characteristic XRPD of amorphous form of tafamidis as obtained in Example 24.

FIG. 3 is a characteristic XRPD of amorphous solid dispersion of tafamidis with polyvinyl pyrrolidone (PVP K90) as obtained in Example 25.

FIG. 4 is a characteristic XRPD of amorphous solid dispersion of tafamidis with hydroxy propyl cellulose (HPC) as obtained in Example 26.

FIG. 5 is a characteristic XRPD of amorphous solid dispersion of tafamidis with hydroxypropyl methyl cellulose phthalate (HPMC-Phthalate) as obtained in Example 27.

FIG. 6 is a characteristic XRPD of amorphous solid dispersion of tafamidis with hydroxypropyl methyl cellulose E-50 (HPMC-E50) as obtained in Example 28.

FIG. 7 is a characteristic XRPD of amorphous solid dispersion of tafamidis with hydroxypropyl methyl cellulose acetate succinate (HPMC-AS) as obtained in Example 29.

FIG. 8 is a characteristic XRPD of amorphous solid dispersion of tafamidis with polyvinyl acetate phthalate (PV-AP) as obtained in Example 30.

FIG. 9 is a characteristic XRPD of amorphous solid dispersion of tafamidis with polyvinyl pyrrolidone (PVP K30) as obtained in Example 31.

FIG. 10 is a characteristic XRPD of Tafamidis Meglumine salt as obtained in Example 46.

DETAILED DESCRIPTION OF THE INVENTION

Figure 11:
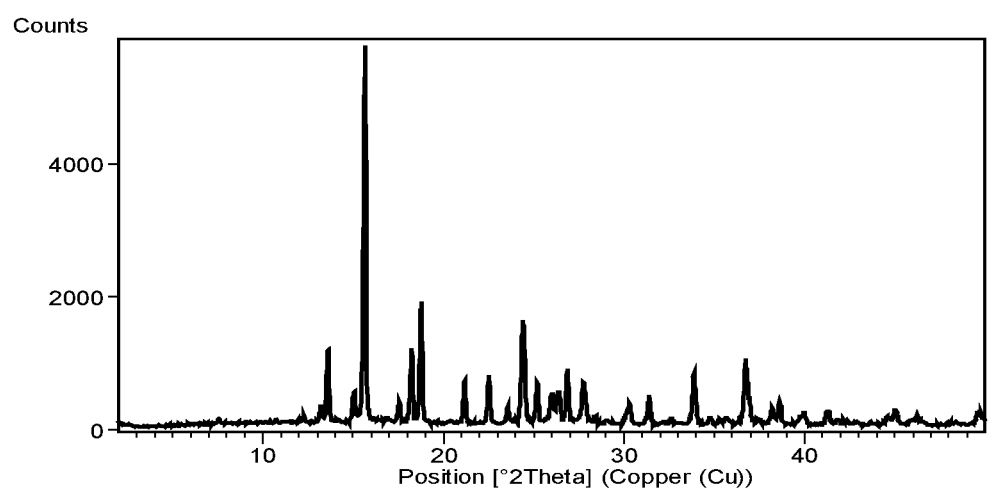
FIG. 11 is a characteristic XRPD of 4-(3,5-dichlorobenzamido)-3-hydroxybenzoic acid as obtained in Example 48.

In one embodiment, the present invention provides a process for the preparation of crystalline Form 4 of tafamidis, the process comprising:
(a) providing a solution of tafamidis in a solvent selected from the group consisting of $C_1$-$C_4$ amides, $C_2$-$C_3$ sulfoxides, $C_5$-$C_6$ pyrrolidones, and mixtures thereof;
(b) obtaining crystalline Form 4 of tafamidis from the solution of step (a) by
    (i) combining the solution of step (a) with an anti-solvent selected from the group consisting of $C_1$-$C_8$ alcohols, $C_3$-$C_{10}$ ketones, $C_1$-$C_3$ nitriles, water and mixtures thereof; or
    (ii) removing the solvent from the solution of step (a).

In one embodiment, in step (a), the solvent is selected form the group consisting of $C_1$-$C_4$ amides such as dimethylformamide, dimethylacetamide, and the like; $C_2$-$C_3$ sulfoxides such as dimethylsulfoxide and the like; $C_2$-$C_5$ ethers such as dioxane, tetrahydrofuran and the like; $C_5$-$C_6$ pyrrolidones such as N-Methyl-2-pyrrolidone and the like; and mixtures thereof.

In one embodiment, step (a) may be carried out at a temperature from about 20° C. to about 120° C. Stirring may be continued for any desired time period to achieve a complete dissolution of tafamidis. The solution may be optionally filtered to get a particle-free solution.

In one embodiment, the term "combining" means adding the solution of step (a) to anti-solvent or adding anti-solvent to the solution of step (a).

In one embodiment, in step (bi), the anti-solvent is selected from the group consisting C1-C8 alcohols such as methanol, ethanol, 1-propanol, 2-propanol, 1-butanol, 2-butanol, 1-pentanol and the like; C3-C10 ketones such as acetone, methyl isobutyl ketone, ethyl methyl ketone and the like; C1-C3 nitrile solvents such as acetonitrile, propionitrile and the like; water; and mixtures thereof.

In one embodiment, step (bi) may be carried out at a temperature from about 10° C. to about 30° C.

In one embodiment, step (bi) may be carried out at a temperature from about 15° C. to about 20° C.

In one embodiment, in step (bii), removal of solvent may be accomplished by 20 substantially complete evaporation of the solvent; or concentrating the solution, cooling the solution if required and filtering the obtained solid. The solution may also be completely evaporated in, for example, a rotavapor, a vacuum paddle dryer or in a conventional reactor under vacuum above about 720 mm Hg.

In one embodiment, the present invention provides a process for the preparation of crystalline Form 4 of tafamidis, the process comprising:
(a) providing a solution of tafamidis in a solvent selected from the group consisting of $C_1$-$C_4$ amides, $C_2$-$C_3$ sulfoxides, $C_5$-$C_6$ pyrrolidones, and mixtures thereof;
(b) obtaining crystalline Form 4 of tafamidis from the solution of step (a) by combining the solution of step (a) with an anti-solvent selected from the group consisting of $C_1$-$C_8$ alcohols, $C_3$-$C_{10}$ ketones, $C_1$-$C_3$ nitriles, water and mixtures thereof.

In one embodiment, the present invention provides a process for the preparation of crystalline Form 4 of tafamidis, the process comprising:
(a) providing a solution of tafamidis in a solvent selected from the group consisting of $C_1$-$C_4$ amides, $C_2$-$C_3$ sulfoxides, and mixtures thereof;
(b) obtaining crystalline Form 4 of tafamidis from the solution of step (a) by combining the solution of step (a) with an anti-solvent selected from the group consisting of $C_1$-$C_8$ alcohols, water and mixtures thereof.

In one embodiment, the present invention provides a process for the preparation of crystalline Form 4 of tafamidis, the process comprising:
(a) providing a solution of tafamidis in a solvent selected from the group consisting of $C_1$-$C_4$ amides such as dimethylformamide, dimethylacetamide; $C_2$-$C_3$ sulfoxides such as dimethylsulfoxide, and mixtures thereof;
(b) obtaining crystalline Form 4 of tafamidis from the solution of step (a) by combining the solution of step (a) with an anti-solvent selected from the group consisting of $C_1$-$C_8$ alcohols such as methanol, ethanol, isopropanol; water and mixtures thereof.

In one embodiment, the tafamidis of step (a) is prepared by reacting 4-(3,5-dichlorobenzamido)-3-hydroxybenzoic acid with a coupling agent in a solvent to obtain a reaction mixture comprising tafamidis.

In one embodiment, the solvent comprises amide solvent.

In one embodiment, amide solvent is selected from dimethylformamide, dimethylacetamide, or mixtures thereof.

In one embodiment, the step (a) is carried out in presence of additional solvent.

In one embodiment, the additional solvent is selected from the group consisting of hydrocarbons such as toluene, xylene, chlorobenzene and the like; ethers such as tetrahydrofuran, dioxane and the like; sulfoxides such as dimethyl sulfoxide; N-methyl pyrrolidone; and mixtures thereof.

In one embodiment, the coupling agent is selected from the group consisting of MsOH (methanesulfonic acid), TsOH (p-toluenesulfonic acid), MsCl (methanesulfonyl chloride) TsCl (p-toluenesulfonyl chloride), HBTU (N,N,N', N'-tetramethyl-O-(1H-benzotriazol-1-yl)uronium hexafluorophosphate), EDCI (N-(3-dimethylaminopropyl)-N'-ethylcarbodiimide hydrochloride), HOBt (hydroxybenzotriazole hydrate), COMU ((1-cyano-2-ethoxy-2-oxoethylidenaminooxy)dimethylamino-morpholino-carbenium hexafluorophosphate), TBTU (O-(benzotriazol-1-yl)-N,N,N',N'-tetramethyluronium tetrafluoroborate), TATU (O-(7-azabenzotriazole-1-yl)-1,1,3,3-tetramethyluronium tetrafluoroborate), Oxyma (ethyl (hydroxyimino)cyanoacetate), PyBOP ((benzotriazol-1-yloxy) tripyrrolidinophosphonium hexafluorophosphate), HOTT (S-(1-oxido-2-pyridyl)-N,N,N',N'-tetramethylthiuronium hexafluorophosphate), FDPP (pentafluorophenyl diphenylphosphinate), T3P (propylphosphonic anhydride), DMTMM (4-(4,6-dimethoxy-1,3,5-triazin-2-yl)-4-methylmorpholinium tetrafluoroborate), PyOxim ([ethyl cyano(hydroxyimino)acetato-O2]tri-1-pyrrolidinylphosphonium hexafluorophosphate), TSTU (N,N,N,N-tetramethyl-O—(N-succinimidyl)uronium tetrafluoroborate), TDBTU (O-(3, 4-dihydro-4-oxo-1,2,3-benzotriazin-3-yl)-N,N,N',N'-tetramethyluronium tetrafluoroborate), TPTU (O-(2-oxo-1 (2H)pyridyl)-N,N,N',N'-tetramethyluronium tetrafluoroborate), TOTU (O-[(ethoxycarbonyl)cyanomethylenamino]-N, N,N',N'-tetramethyluronium tetrafluoroborate), IIDQ (isobutyl 1,2-dihydro-2-isobutoxy-1-quinolinecarboxylate), PyCIU (chlorodipyrrolidinocarbenium hexafluorophosphate), DCC (dicyclohexylcarbodiimide), DIC (diisopropylcarbodiimide), TOTT (N,N,N',N'-tetramethyl-S-(1-oxido-2-pyridyl)thiouronium tetrafluoroborate), EEDQ (N-Ethoxycarbonyl-2-ethoxy-1,2-dihydroquinoline), HDMC (N-[(5-Chloro-3-oxido-1H-benzotriazol-1-yl)-4-morpholinylmethylene]-N-methylmethanaminium hexafluorophosphate), HCTU (2-(6-chloro-1H-benzotriazole-1-yl)-1,1,3,3-tetramethylaminium hexafluorophosphate), DEPBT (3-(diethoxyphosphoryloxy)-1,2,3-benzotriazin-4(3H)-one), PyOxim (ethyl cyano(hydroxyimino) acetato-O2]tri-1-pyrrolidinylphosphonium hexafluorophosphate), PyAOP ((7-azabenzotriazol-1-yloxy) tripyrrolidinophosphonium hexafluorophosphate), PyBOP (benzotriazol-1-yl-oxytripyrrolidinophosphonium hexafluorophosphate), BOP (benzotriazol-1-yloxytris(dimethylamino)phosphonium hexafluorophosphate), HOOBt (hydroxy-3,4-dihydro-4-oxo-1,2,3-benzotriazine), HOSu (N-hydroxysuccinimide), HOAt (1-hydroxy-7-azabenzotriazole), TFFH (tetramethylfluoroformamidinium hexafluorophosphate), sulfuric acid, and mixtures thereof.

In one embodiment, the reaction may be carried out in the presence of a base selected from organic base or inorganic base.

The organic base includes but is not limited to diisopropylethylamine, triethylamine, tributylamine, triphenylamine, pyridine, lutidine (2,6-dimethylpyridine), collidine (2,4, 6-trimethylpyridine), imidazole, DMAP (4-(dimethylamino) pyridine), or mixtures thereof.

The inorganic base includes but is not limited to lithium carbonate, sodium carbonate, potassium carbonate, sodium bicarbonate, potassium bicarbonate, sodium hydroxide, potassium hydroxide, or mixtures thereof.

In one embodiment, the tafamidis of step (a) is prepared by reacting salt of tafamidis with an acid to give tafamidis.

In one embodiment, the salt of tafamidis is morpholine salt of tafamidis.

In one embodiment, the crystalline Form 4 of tafamidis obtained in step (b) is substantially free of crystalline Form 1 of tafamidis.

In one embodiment, the term "substantially free" means the amount referred to is in no detectable quantity.

In one embodiment, the term "no detectable quantity" refers to an amount of less than about 0.5% w/w. Preferably, less than about 0.1% w/w, still more preferably, absent.

In one embodiment, the crystalline Form 4 of tafamidis obtained in step (b) is stable.

As used herein, the term "stable" refers to crystalline Form 4 of tafamidis which retains its original polymorphic form without undergoing polymorphic conversion over time.

In one embodiment, the stable crystalline Form 4 of tafamidis obtained by the process as described herein above has no detectable quantity of Form 1 of tafamidis on storage.

In one embodiment, the stable crystalline Form 4 of tafamidis obtained by the process as described herein above has no detectable quantity of Form 1 of tafamidis at room temperature or under accelerated stability conditions for extended periods of time.

In one embodiment, the present invention provides a process for the preparation of crystalline Form 4 of tafamidis, the process comprising:
 (a) reacting 4-(3,5-dichlorobenzamido)-3-hydroxybenzoic acid with a coupling agent in a solvent comprising amide solvent to obtain a reaction mixture comprising tafamidis;
 (b) optionally, partially concentrating the reaction mixture of step (a);
 (c) obtaining crystalline Form 4 of tafamidis from the reaction mixture of step (a) or step (b).

In one embodiment, in step (a), the amide solvent is selected from dimethylformamide, dimethylacetamide, or mixtures thereof.

In one embodiment, the step (a) is carried out in presence of additional solvent.

In one embodiment, the additional solvent is selected from the group consisting of hydrocarbons such as toluene, xylene, chlorobenzene and the like; ethers such as tetrahydrofuran, dioxane and the like; sulfoxides such as dimethyl sulfoxide; N-methyl pyrrolidone; and mixtures thereof.

In one embodiment, the coupling agent of step (a) is as discussed supra.

In one embodiment, in step (c), the crystalline Form 4 of tafamidis is obtained by any one of the following:
 (i) combining the reaction mixture of step (a) or step (b) with an anti-solvent selected from the group consisting of $C_1$-$C_8$ alcohols, $C_3$-$C_{10}$ ketones, $C_1$-$C_3$ nitriles, water and mixtures thereof; or
 (ii) removing the solvent from the reaction mixture of step (a) or step (b).

In one embodiment, the term "combining" means adding the reaction mixture of step (a) or step (b) to anti-solvent or adding anti-solvent to the reaction mixture of step (a) or step (b).

In one embodiment, the anti-solvent in step (ci) is as discussed supra.

In one embodiment, step (ci) may be carried out at a temperature from about 10° C. to about 35° C. The stirring time may range from about 30 minutes to about 10 hours, or longer.

In one embodiment, step (ci) may be carried out at a temperature from about 15° C. to about 25° C.

In one embodiment, in step (cii), removal of solvent may be accomplished by substantially complete evaporation of the solvent; or concentrating the solution, cooling the solution if required and filtering the obtained solid. The solution may also be completely evaporated in, for example, a rotavapor, a vacuum paddle dryer or in a conventional reactor under vacuum above about 720 mm Hg.

In one embodiment, the present invention provides a process for the preparation tafamidis, the process comprising:
 (a) reacting 4-(3,5-dichlorobenzamido)-3-hydroxybenzoic acid with a coupling agent in a solvent comprising dimethylacetamide to obtain a reaction mixture comprising tafamidis;
 (b) optionally, partially concentrating the reaction mixture of step (a);
 (c) obtaining crystalline Form 4 of tafamidis from the reaction mixture of step (a) or step (b) by any one of the following:

(i) combining the reaction mixture of step (a) or step (b) with an anti-solvent selected from the group consisting of $C_1$-$C_8$ alcohols, $C_3$-$C_{10}$ ketones, $C_1$-$C_3$ nitriles, water and mixtures thereof; or (ii) removing the solvent from the reaction mixture of step (a) or step (b).

In one embodiment, the tafamidis obtained in step (c) is substantially free of crystalline Form 1 of tafamidis.

In one embodiment, the present invention provides stable crystalline Form 4 of tafamidis prepared using the process of the present invention.

In one embodiment, the tafamidis Form 4 prepared by the process of the present invention is obtained without formation of Form 1.

In one embodiment, the tafamidis Form 4 prepared by the process of the present invention is obtained without contamination of Form 1.

In one embodiment, the tafamidis Form 4 prepared by the process of the present invention is stable and does not get converted to any other polymorphic forms.

In one embodiment, the tafamidis obtained is not isolated from the reaction mixture and is reacted with an inorganic or organic base to form the tafamidis salt.

In one embodiment, the term "not isolated" means tafamidis is not separated as a solid.

In one embodiment, the present invention provides a process wherein tafamidis is obtained in a purity of ≥99.0% and wherein the level of impurity A or impurity B is less than 0.15%.

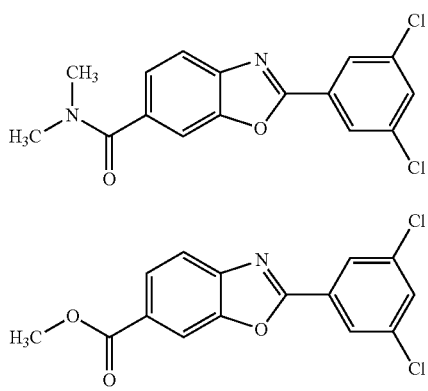

In one embodiment, the tafamidis is obtained in a purity of ≥99.0% and wherein the level of impurity A or impurity B is less than 0.10%.

In one embodiment, the tafamidis is obtained in a purity of ≥99.0% and wherein the level of impurity A or impurity B is less than 0.05%.

In one embodiment, the tafamidis is obtained in a purity of ≥99.0% and wherein the impurity A or impurity B is not detected.

In one embodiment, the tafamidis is obtained in a purity of ≥99.5% and wherein the level of impurity A or impurity B is less than 0.15%.

In one embodiment, the tafamidis is obtained in a purity of ≥99.8% and wherein the level of impurity A or impurity B is less than 0.15%.

In one embodiment, the present invention provides salt of tafamidis, compound of formula I,

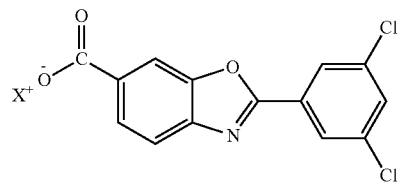

wherein X is a cation capable of forming a salt selected from a metal element or an organic base.

In one embodiment, the metal element is selected from alkali metal or alkali earth metal.

In one embodiment, the alkali metal is selected from the group consisting of sodium, potassium and lithium.

In one embodiment, alkali earth metal is selected from the group consisting of calcium, magnesium and strontium.

In one embodiment, the organic base is having a formula of $NR_1R_2R_3$; wherein $R_1$, $R_2$, $R_3$ may be independently selected from the group consisting of H, $C_1$-$C_6$ alkyl, $C_3$-$C_6$ cycloalkyl, $C_6$-$C_{18}$ aryl or R1 may be H and $R_2$ and $R_3$ together with the nitrogen atom to which they are attached forms a 4-8 membered heterocyclic ring which may be optionally substituted.

In one embodiment, the organic base is having a formula NR1R2R3; wherein R1, R2, R3 may be independently selected from the group consisting of H and C1-C6 alkyl and C1-C6 alkyl is optionally substituted with C6-C18 aryl.

In one embodiment, the organic base is having a formula NR1R2R3; wherein R1, R2, R3 may be independently selected from the group consisting of H and C1-C6 alkyl and C1-C6 alkyl is optionally substituted with C6-C18 aryl, wherein the aryl group may be optionally substituted with one or more substituents selected from the group consisting of nitro, cyano, amino, halogen, hydroxyl, C1-C6 alkoxy and C1-C6 alkyl.

In one embodiment, the organic base is selected from the group consisting of diethylamine, diisobutylamine, diisopropylamine, dibenzylamine, dicyclohexylamine, tert-butyl amine, cyclopropyl amine.

In one embodiment, the organic base is having a formula $NR_1R_2R_3$; wherein $R_1$ may be H and $R_2$ and R3 together with the nitrogen atom to which they are attached forms a 4-8 membered heterocyclic ring which may be optionally substituted.

In one embodiment, the organic base is having a formula $NR_1R_2R_3$; wherein $R_1$ may be H and $R_2$ and $R_3$ together with the nitrogen atom to which they are attached forms a 4-8 membered heterocyclic ring which may be optionally substituted with N, O or S.

In one embodiment, the organic base is selected from the selected from the group consisting morpholine, piperazine and pyridine, In one embodiment, the organic base is selected from the group consisting of methylamine, dimethylamine, dipropylamine, tripropylamine, tributylamine, N,N-dimethylcyclohexylamine trimethylamine, ethylamine, propylamine, butylamine, dibutylamine, triethylamine, diisopropylethylamine, cyclopropyl amine, aniline, N,N-dimethyl aniline, N-methylpiperidine, N-methyl morpholine, N-tert-butyl benzyl amine, N-benzylmethylamine and piperidine.

The term "C1-C6 alkyl" as used herein refers to an aliphatic hydrocarbon group which may be straight or branched having C1-C6 carbon atoms in the chain. The term "branched" means that one or lower alkyl groups such as methyl, ethyl or propyl are attached to a linear alkyl chain. The alkyl groups include but are not limited to methyl, ethyl, n-propyl, isopropyl, n-butyl, isobutyl, tert-butyl, n-pentyl.

The term "C6-C18 aryl" as used herein refers to an aromatic hydrocarbon group having a single ring or multiple aromatic rings fused together. Preferred aryl groups have C6-C18 carbon atoms, more preferably have C6-C10 carbon atoms. The aryl groups include but are not limited to phenyl, naphthyl or tetrahydronaphthyl.

The term "halogen" refers to iodo, bromo, chloro or fluoro.

The term "C1-C6 alkoxy" as used herein refers to C1-C6 alkyl group, wherein alkyl is as defined herein, that is linked to the rest of the molecule or to another group through an oxygen atom. The alkoxy groups include but are not limited to methoxy, ethoxy, n-propoxy, isopropoxy, n-butoxy, isobutoxy, tert-butoxy, n-pentoxy.

In one embodiment, the present invention provides salt of tafamidis, compound of formula I,

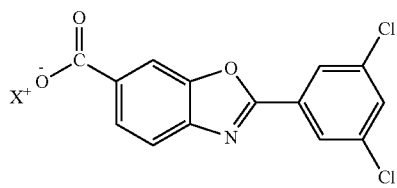

I wherein X is a cation capable of forming a salt selected from an organic base.

wherein the organic base is having a formula of $NR_1R_2R_3$; wherein $R_1, R_2, R_3$ may be independently selected from the group consisting of H, $C_1$-$C_6$ alkyl, aryl or $R_1$ and $R_2$ may join together along with the nitrogen atom to which they are attached an optionally substituted heterocyclic ring having 4 to 8 ring atoms.

In one embodiment, the present invention provides a process for preparation of salt of tafamidis comprising:
(a) reacting tafamidis with an inorganic or organic base to form a reaction mixture comprising the tafamidis salt; and
(b) separating the tafamidis salt from the reaction mixture.

In one embodiment, tafamidis is reacted with an inorganic base selected from the group consisting of sodium hydroxide, sodium carbonate and sodium bicarbonate to give a reaction mixture comprising sodium salt of tafamidis and separating sodium salt of tafamidis from the reaction mixture.

In one embodiment, tafamidis is reacted with an inorganic base selected from the group consisting of potassium hydroxide, potassium carbonate and potassium bicarbonate to give a reaction mixture comprising potassium salt of tafamidis and separating potassium salt of tafamidis from the reaction mixture.

In one embodiment, tafamidis is reacted with an inorganic base such as calcium hydroxide to give a reaction mixture comprising calcium salt of tafamidis and separating calcium salt of tafamidis from the reaction mixture.

In one embodiment, tafamidis is reacted with an inorganic base such as magnesium hydroxide to give a reaction mixture comprising magnesium salt of tafamidis and separating magnesium salt of tafamidis from the reaction mixture.

In one embodiment, tafamidis is reacted with an organic base selected from the group consisting of morpholine, diethylamine, diisobutylamine, dibenzylamine, dicyclohexylamine, tert-butyl amine, cyclopropyl amine, dibenzylamine to form a salt of tafamidis and separating the salt of tafamidis from the reaction mixture.

In one embodiment, the present invention provides organic amine salts of tafamidis.

In one embodiment, the present invention provides morpholine salt of tafamidis.

In one embodiment, the present invention provides a process for preparation of salt of tafamidis comprising:
a) reacting tafamidis with an organic base to form a reaction mixture comprising the tafamidis salt; and
b) separating the tafamidis salt from the reaction mixture.

In one embodiment, the present invention provides tert-butyl amine salt of tafamidis.

In one embodiment, the present invention provides dicyclohexylamine salt of tafamidis.

In one embodiment, the present invention provides diisopropylamine salt of tafamidis.

In one embodiment, the present invention provides diethylamine salt of tafamidis.

In one embodiment, the present invention provides dibenzylamine salt of tafamidis.

In one embodiment, the present invention provides diisobutylamine salt of tafamidis.

In one embodiment, the present invention provides cyclopropylamine salt of tafamidis. In one embodiment, the reaction of tafamidis with an inorganic or organic base may be carried out in presence of a solvent.

The reaction may be carried out in the presence of a solvent selected from the group consisting of esters such as methyl acetate, ethyl acetate, n-propyl acetate, isopropyl acetate, tert-butyl acetate and the like; hydrocarbons such as toluene, xylene, chlorobenzene, heptane, hexane and the like; ethers such as diethyl ether, diisopropyl ether, methyl tert-butyl ether, tetrahydrofuran, dioxane and the like; ketones such as acetone, ethyl methyl ketone, methyl isobutyl ketone and the like; alcohols such as methanol, ethanol, n-propyl alcohol, isopropyl alcohol, n-butyl alcohol, isobutyl alcohol, sec-butyl alcohol, tert-butyl alcohol, pentanol, octanol and the like; haloalkanes such as dichloromethane, chloroform, ethylene dichloride, and the like; dimethyl sulfoxide; dimethyl acetamide; water; or mixtures thereof.

The reaction may be carried out at a temperature of about 0° C. to about 100° C. The stirring time may range from about 30 minutes to about 10 hours, or longer.

In one embodiment, the present invention provides a process, further comprising the step of converting the obtained tafamidis salt to tafamidis:
(a) treating the salt of tafamidis with an acid to obtain a reaction mixture; and
(b) separating and isolating the tafamidis obtained in step (a)
wherein the tafamidis obtained is amorphous or crystalline.

In one embodiment, in step (a) the acid may be selected from the group consisting of hydrochloric acid, hydrobromic acid, acetic acid, formic acid, octanoic acid, propionic acid, hexanoic acid, methanesulfonic acid, and the like.

In one embodiment, the separation may be carried out by any method known in art such as extracting into a solvent, precipitation of tafamidis from the reaction mixture.

In one embodiment, the isolation may be carried out by filtration, centrifugation, and distillation.

In one embodiment, the amorphous tafamidis obtained in step (b) is converted to crystalline Form 1.

In one embodiment, the amorphous tafamidis obtained in step (b) is converted to crystalline Form 2.

In one embodiment, the amorphous tafamidis which is converted to crystalline Form 2 is the tetrahydrofuran solvate.

In one embodiment, the amorphous tafamidis obtained in step (b) is converted to crystalline Form 4.

In one embodiment, the amorphous tafamidis obtained in step (b) is converted to crystalline Form 6.

In one embodiment, the amorphous tafamidis obtained in step (b) is converted to a mixture of crystalline selected from the group consisting of Form 1, Form 2, Form 4 and Form 6.

In one embodiment, the crystalline tafamidis obtained in step (b) is crystalline Form 1.

In one embodiment, the crystalline tafamidis obtained in step (b) is crystalline Form 2.

In one embodiment, the crystalline tafamidis obtained in step (b) is crystalline Form 4.

In one embodiment, the crystalline tafamidis obtained in step (b) is crystalline Form 6.

In one embodiment, the crystalline tafamidis obtained in step (b) is a mixture of crystalline Form 1, Form 2, Form 4 and Form 6.

In one embodiment, the crystalline tafamidis obtained in step (b) is a mixture of crystalline Form 2, Form 4 and Form 6.

In one embodiment, the present invention provides a process for the preparation of tafamidis comprising:
(a) reacting tafamidis with an inorganic or an organic base to form a reaction mixture comprising the tafamidis salt;
(b) separating the salt of tafamidis from the reaction mixture; and
(c) converting the separated salt of tafamidis to tafamidis, wherein the obtained tafamidis may be amorphous or crystalline.

In one embodiment, the present invention provides a solvate of tafamidis.

In one embodiment, the solvate of tafamidis may be selected from the group consisting of alcohol solvate such as methanol, ethanol, propanol, isopropanol, n-butanol, isobutanol, propyleneglycol (racemic or R or S isomer) and the like; esters such as ethyl acetate, ether such as tetrahydrofuran, dioxane, diisopropyl ether, methyl tert-butyl ether, amide such as dimethyl formamide, acid such as formic acid, propionic acid, hexanoic acid, octanoic acid and the like.

In one embodiment, the solvate of tafamidis is converted to crystalline tafamidis.

In one embodiment, the solvate of tafamidis is converted to amorphous tafamidis.

In another embodiment, the present invention provides a hydrate of tafamidis.

In one embodiment, the hydrate of tafamidis is converted to amorphous tafamidis.

In one embodiment, the hydrate of tafamidis is converted to crystalline tafamidis.

In one embodiment, the present invention provides a process for the preparation of tafamidis meglumine, the process comprising:
(a) reacting tafamidis with meglumine to form a reaction mixture comprising the tafamidis salt; and
(b) separating the tafamidis meglumine from the reaction mixture.

In one embodiment, in step (a), tafamidis is reacted with meglumine in the presence of a solvent.

In one embodiment, the solvent is selected from the group consisting of amides such as dimethylformamide, dimethylacetamide and the like; hydrocarbons such as toluene, xylene, chlorobenzene and the like; sulfoxides such as dimethyl sulfoxide; N-methyl pyrrolidone; alcohols such as methanol, ethanol, 1-propanol, 2-propanol, 1-butanol, 2-butanol, 1-pentanol and the like; ketones such as acetone, methyl isobutyl ketone, ethyl methyl ketone and the like; nitrile solvents such as acetonitrile, propionitrile and the like; water; and mixtures thereof.

In one embodiment, step (a) may be carried out at a temperature from about 10° C. to about 35° C. The stirring time may range from about 30 minutes to about 10 hours, or longer.

In one embodiment, in step (a), the tafamidis may be present in the solution and used for reaction with meglumine.

In one embodiment, in step (a), the tafamidis may be present in the solution and used for reaction with meglumine, without isolating tafamidis from the solution.

In one embodiment, in step (b), the tafamidis meglumine is separated from the reaction mixture by filtration followed by drying the solid tafamidis meglumine.

In one embodiment, the tafamidis meglumine may be recrystallized from a solvent selected from the group consisting of alcohols such as methanol, ethanol, 1-propanol, 2-propanol, 1-butanol, 2-butanol, 1-pentanol and the like; water and mixture thereof.

In one embodiment, the present invention provides preparation of an amorphous solid dispersion of tafamidis or salt thereof together with at least one pharmaceutically acceptable carrier, the process comprising:
(a) providing a solution or mixture of tafamidis or salt thereof together with at least one pharmaceutically acceptable carrier in a solvent; and
(b) obtaining the amorphous solid dispersion of tafamidis or salt thereof together with at least one pharmaceutically acceptable carrier from the solution or mixture of step (a).

In one embodiment, the pharmaceutically acceptable carrier is selected from the group consisting of croscarmellose sodium, micro crystalline cellulose (MCC), hydroxyethylcellulose (HEC), hydroxypropylcellulose (HPC), hydroxypropylmethylcellulose (HPMC), hydroxymethylethylcellulose (HEMC), ethylcellulose (EC), methylcellulose (MC), cellulose esters, cellulose glycolate, hydroxypropyl methyl cellulose phthalate, hydroxypropyl methyl cellulose acetate phthalate, polymethylacrylate (HPMCP), hypromellose, vinylpyrrolidone, polyvinylpyrrolidone, mannitol, polyvinyl acetate phthalate, polyethylene glycol and copovidone.

In one embodiment, the solvent is selected from the group consisting of ethers, ketones, esters, halogenated hydrocarbons, amides, alcohols, water, and mixtures thereof.

In one embodiment, the amorphous solid dispersion of tafamidis with at least one pharmaceutically acceptable carrier prepared using the process of the present invention, contains tafamidis in amorphous form together with at least one pharmaceutically acceptable carrier.

In one embodiment, the present invention provides stable amorphous solid dispersion of tafamidis with at least one pharmaceutically acceptable carrier prepared using the process of the present invention.

In one embodiment, the present invention provides a tafamidis premix comprising tafamidis, and premixing agents, the process comprising:

(i) providing an intimate mixture comprising the solvent system, tafamidis and premixing agents and optionally, water; and
(ii) obtaining the premix of tafamidis, wherein the tafamidis used is amorphous or crystalline.

In one embodiment, the present invention provides pharmaceutical compositions comprising tafamidis or salt thereof obtained by the processes herein described, having a D90 particle size of less than about 250 microns, preferably less than about 150 microns, more preferably less than about 50 microns, still more preferably less than about 20 microns, still more preferably less than about 15 microns and most preferably less than about 10 microns.

In one embodiment, the present invention provides pharmaceutical compositions comprising tafamidis or salt thereof obtained by the processes herein described, having a D50 particle size of less than about 250 microns, preferably less than about 150 microns, more preferably less than about 50 microns, still more preferably less than about 20 microns, still more preferably less than about 15 microns and most preferably less than about 10 microns.

The particle size disclosed here can be obtained by, for example, any milling, grinding, micronizing or other particle size reduction method known in the art to bring the solid state tafamidis or salt thereof into any of the foregoing desired particle size range.

The examples that follow are provided to enable one skilled in the art to practice the invention and are merely illustrative of the invention. The examples should not be read as limiting the scope of the invention as defined in the features and advantages.

EXAMPLES

Example 1: Preparation of Tafamidis Morpholine Salt

Tafamidis free acid (0.5 g) and ethyl acetate (25 mL) was stirred at about 25-30° C. To this was added morpholine (0.15 g) at about 25-30° C. to obtain a mixture. The mixture was stirred at room temperature for about 20-24 hr. The obtained slurry was filtered and the solid was dried in air oven for about 1-2 hr at about 50-55° C. to obtain 0.45 g of title solid. Below table shows the examples of tafamidis organic amine salts and it was prepared by following the procedure as described in Example 1.

| Examples | Tafamidis organic amine salts | Organic Amine (g) | Yield(g) |
|---|---|---|---|
| Example 2 | tafamidis tert-butyl amine salt | tert-butyl amine (0.13 g). | 0.5 g |
| Example 3 | tafamidis di-cyclohexyl amine salt | di-cyclohexyl amine (0.323 g). | 0.6 g |
| Example 4 | tafamidis di-ethyl amine salt | di-ethyl amine (0.126 g). | 0.48 g |
| Example 5 | tafamidis di-isopropyl amine salt | di-isopropyl amine (0.126 g). | 0.53 g |
| Example 6 | tafamidis di-benzyl amine salt | di-benzyl amine (0.352 g). | 0.7 g |
| Example 7 | tafamidis di-isobutyl amine salt | di-isobutyl amine (0.23 g). | 0.45 g |
| Example 8 | tafamidis cyclopropyl amine salt | cyclopropyl amine (0.101 g). | 0.35 g |

Example 9: Preparation of Tafamidis Magnesium Salt

Tafamidis free acid (0.5 g) and water (20 mL) was stirred at about 25-30° C. To this was added magnesium hydroxide (0.104 g) at about 25-30° C. The mixture was stirred at about 50-55° C. for about 15 min, cooled the suspension to room temperature and stirred for about 20-24 hr. The obtained slurry was filtered and the solid was dried in air oven for about 4-5 hr at about 50-55° C. to obtain 0.4 g of title solid.

Below table shows the examples of tafamidis inorganic base salts and it was prepared by following the procedure as described in Example 9.

| Examples | Tafamidis inorganic base salts | Inorganic base (g) | Yield(g) |
|---|---|---|---|
| Example 10 | tafamidis potassium salt | potassium hydroxide (0.105 g) | 0.1 g |
| Example 11 | tafamidis calcium salt | calcium hydroxide (0.118 g) | 0.38 g |
| Example 12 | tafamidis sodium salt | sodium hydroxide (0.1 g) | 0.1 g |

Example 13: Preparation of Tafamidis

Tafamidis morpholine salt (3 g), tetrahydrofuran (102 mL) and water (30 mL) were added to obtain a reaction mixture. To this was added 36% aq. HCl solution (0.3 mL) and stirred the clear solution for about 30 min. To this was added sodium chloride and stirred for about 15 min. The layers were separated and the organic layer was washed with 25% brine solution. The organic layer was dried over sodium sulfate, filtered and spray dried the clear solution using following parameters to obtain 0.55 g of tafamidis.

Aspirator: 1800 rpm, Speed Rate: 25 rpm, Inlet temperature: 60° C., Outlet temperature: 45° C., Nitrogen pressure: 1.0 Kg/Cm$^2$, Vacuum: 180 mmHg.

Example 14: General Procedure

Tafamidis salt is added to a solvent to obtain a reaction mixture. An acid is added to the obtained mixture to obtain clear solution. The clear solution is washed with brine and the organic layer dried over sodium sulfate. The organic layer is filtered and spray dried using the conditions described in example 13 to obtain tafamidis.

Example 15: Preparation of 3,5-dichlorobenzoyl Chloride 3,5-Dichlorobenzoic acid (30 g) was charged in toluene (150 mL) and dimethyl formamide (3 mL). Thionyl chloride (49.2 g) was added to the reaction mass and heated to reflux for about 3 h. The reaction mass was cooled to about 50° C., toluene was distilled off by vacuum and degassed at about 60° C. for about 1 hr to obtain title compound as an oil. Yield: 100%; Purity: 97.13%.

Example 16: Preparation of 4-(3,5-dichlorobenzamido)-3-hydroxybenzoic Acid

4-Amino-3-hydroxybenzoic acid (15 g) was dissolved at about 20° C. in a mixture of tetrahydrofuran (285 mL) and water (28.5 mL). 3,5-Dichlorobenzoyl chloride (26.67 g)

was dissolved in tetrahydrofuran (30 mL) and added to reaction mass at 15-20° C. The reaction mass was stirred for about 30 min at about 15-20° C. Triethylamine (11.88 g) was added and the mixture was heated at about 35-40° C. and stirred for about 90 min. Tetrahydrofuran was distilled off under vacuum. Ethanol (255 mL) was charged to the reaction mass. Slurry was cooled to about 15-20° C. and stirred for about 1 hr and was filtered. The solid was washed with ethanol and dried in Air Tray Drier (ATD) at about 50-55° C. for about 3 hr to obtain 27.2 g of title compound. Yield: 85.15%; Purity: 99.67%.

Example 17: Preparation of 4-(3,5-dichlorobenzamido)-3-hydroxybenzoic Acid

4-Amino-3-hydroxybenzoic acid (15 g) was dissolved at about 20° C. in a mixture of tetrahydrofuran (285 mL) and water (28.5 mL). 3,5-Dichlorobenzoyl chloride (27.0 g) was dissolved in tetrahydrofuran (30 mL) and added to reaction mass at about 15-20° C. Reaction mass was stirred for about 1 hr at about 15-20° C. Triethylamine (11.88 g) was added, heated to about 35-40° C. and stirred for about 90 min. Tetrahydrofuran was distilled off under vacuum below 50° C. to obtain slurry. Mixture of acetone (150 mL) and water (150 mL) was charged to the slurry and stirred for about 60 min at about 25-30° C. and filtered under vacuum. The solid was washed with acetone (50 mL) and dried in rota vapour under vacuum at about 55-60° C. for about 75 min to obtain 24 g of title compound. Yield: 75.14%, Purity: 95.44%.

Example 18: Preparation of Tafamidis Morpholine Salt 4-(3,5-Dichlorobenzamido)-3-hydroxybenzoic acid (10 g) was charged in solvent mixture of dimethylacetamide (20 mL) and toluene (180 mL), and triethylamine (3.4 g) was added to the slurry. The mixture was stirred at about 20-25° C. for about 1 hr and filtered to remove any insoluble particles. Methanesulfonic acid (4.71 g) was added to the filtrate. The reaction mass was heated to about 115-120° C. and the clear solution was refluxed at about 115-120° C. for about 18-22 hr. The reaction mass was cooled to about 60° C. and tetrahydrofuran (200 mL) was added at about 50-60° C. to the clear solution. The solution was cooled to about 40-45° C. and water (100 mL) was added to it followed by further cooling to about 25-30° C. The two layers were separated and morpholine (4 g) was added to the organic layer. The reaction mass was stirred at about 25-30° C. for about 20-22 hr. The solid was filtered and washed with solvent mixture of tetrahydrofuran and toluene (1:1 v/v) and dried in Air Tray Drier (ATD) at 50-55° C. for about 20 hr to obtain tafamidis morpholine salt. Yield: 7.4 g (61.15%), Purity: 99.79%.

Example 19: Preparation of Tafamidis Form 4

Tafamidis morpholine salt (5 g) was charged in solvent mixture of tetrahydrofuran (200 mL), dimethyl acetamide (10 mL) and toluene (90 mL). 36% aqueous HCl (2.50 mL) was added to this mixture and stirred for about 15 min. Water (50 mL) was added and stirred for about 15 min. The two layers were separated. Dimethyl acetamide (35 mL) was added to the organic layer and THF/toluene solvent mixture was distilled off under reduced pressure at about 55-60° C. up to obtain clear solution. Activated carbon (0.25 g) was added to the clear solution at about 55-60° C. and stirred for about 15 min. The solution was filtered through hyflow and washed with dimethyl acetamide (5 mL). The clear solution was added to water (105 mL) at 25-30° C. for about 15-20 min. The solid was stirred for about 2 hr, filtered, washed with water, suck dried under vacuum for about 10-15 min dried in Air Tray Drier (ATD) for about 12 hr at about 50-55° C. to obtain Form 4 of tafamidis. Yield: 2.9 g (74.35%).

Example 20: Preparation of Tafamidis Form 4

Tafamidis (1 g) was dissolved in dimethylformamide (25 mL) at about 60° C. The clear solution was filtered through hyflo for particle free solution. The clear solution was added to water (50 mL) at about 20-25° C. The solid was stirred for about 2 hr, filtered and suck dried under vacuum. The solid was dried in Air Tray Drier (ATD) for about 2 hr at about 50-55° C. to obtain tafamidis Form 4. Yield: 0.65 g (65%).

Example 21: Preparation of Tafamidis Form 4

Tafamidis (1 g) was dissolved in dimethyl sulfoxide (15 mL) at about 60° C. The clear solution was filtered through hyflo for particle free solution. The clear solution was added to water (50 mL) at about 20-25° C. The solid was stirred for about 2 hr, filtered and suck dried under vacuum. The solid was dried in Air Tray Drier (ATD) for about 2 hr at about 50-55° C. to obtain tafamidis Form 4. Yield: 0.75 g (75%).

Example 22: Preparation of Tafamidis Form 4

Tafamidis (10 g) was dissolved in dimethylacetamide (100 mL) at about 55-60° C. The clear solution was filtered through hyflo for particle free solution. The solution was distilled out under high vacuum at about 65-70° C. The solid was dried under vacuum for about 1 hr at about 65-70° C. to obtain tafamidis Form-4. Yield: 9.5 g (95%).

Example 23: Preparation of Tafamidis Form 4

Tafamidis (47 g) was dissolved in dimethylacetamide (470 mL) at about 55-60° C. The clear solution was filtered through hyflo for particle free solution. The clear solution was added to water (1410 mL) at about 20-25° C. for about 45 min. The solid was stirred for about 2 hr, filtered and suck dried under vacuum. The solid was dried in Air Tray Drier (ATD) for about 12 hr at about 50-55° C. to obtain tafamidis Form 4. Yield: 40.8 g (87%).

Example 24: Preparation of Amorphous Form of Tafamidis

Tafamidis (3 g) was dissolved in 40% methanol in tetrahydrofuran solvent mixture (210 mL). The mixture was heated to about 55° C. to obtain clear solution. The solution was filtered at room temperature for particle free solution. The solvent was removed from the obtained solution by spray dryer. Carrier nitrogen flow 1.0 Kg/cm$^2$, inlet temperature 70° C., outlet temperature 45° C., feed rate 25 rpm, aspirator 1800 rpm, Vacuum 190 mm Hg. The solid was dried in Air Tray Dryer (ATD) at about 50° C. for about 120 min.

Example 25: Preparation of Amorphous Solid Dispersion of Tafamidis with Polyvinyl Pyrrolidone (PVP K90)

Tafamidis (2 g) and polyvinyl pyrrolidone K90 (2 g) were dissolved in 15% methanol in tetrahydrofuran solvent mixture (200 mL). The mixture was heated to about 55-60° C. to obtain clear solution and filtered through hyflo for particle free solution. The solvent was removed from the solution by spray dryer. Carrier nitrogen flow 1.0 Kg/cm$^2$, inlet temperature 60° C., outlet temperature 45° C., feed rate 20 rpm, aspirator 1800 rpm, Vacuum 200 mm Hg. The obtained solid was dried in Air Tray Dryer (ATD) at about 50° C. for about 120 min.

Example 26: Preparation of Amorphous Solid Dispersion of Tafamidis with Hydroxy Propyl Cellulose (HPC)

Tafamidis (2 g) and hydroxypropyl cellulose (HPC) (2 g) were dissolved in 15% methanol in tetrahydrofuran solvent mixture (180 mL). The mixture was heated to about 55-60° C. to obtain clear solution and filtered through hyflo for particle free solution. The solvent was removed from the obtained solution by spray dryer. Carrier nitrogen flow 1.0 Kg/cm$^2$, inlet temperature 60° C., outlet temperature 45° C., feed rate 20 rpm, aspirator 1800 rpm, Vacuum 200 mmHg. The obtained solid was dried in Air Tray Dryer (ATD) at about 50° C. for about 120 min.

Example 27: Preparation of Amorphous Solid Dispersion of Tafamidis with Hydroxypropyl Methyl Cellulose Phthalate (HPMC-Phthalate)

Tafamidis (2 g) and hydroxy propyl methyl cellulose phthalate (HPMC-Phthalate) (2 g) were dissolved in 15% methanol in tetrahydrofuran solvent mixture (150 mL). The mixture was heated to 60° C. to obtain clear solution and filtered through hyflo for particle free solution. The solvent was removed from the obtained solution by spray dryer. Carrier nitrogen flow 1.0 Kg/cm$^2$, inlet temperature 60° C., outlet temperature 45° C., feed rate 25 rpm, aspirator 1800 rpm, Vacuum 180 mm Hg. The obtained solid was dried in Air Tray Dryer (ATD) at about 50° C. for about 105 min.

Example 28: Preparation of Amorphous Solid Dispersion of Tafamidis with Hydroxypropyl Methyl Cellulose E-50 (HPMC-E50)

Tafamidis (2 g) and hydroxy propyl methyl cellulose (HPMC) E50 (2 g) were dissolved in 15% methanol in tetrahydrofuran solvent mixture (180 mL). The mixture was heated to about 60° C. to obtain clear solution and filtered through hyflo for particle free solution. The solvent was removed from the obtained solution by spray dryer. Carrier nitrogen flow 1.0 Kg/cm$^2$, inlet temperature 60° C., outlet temperature 45° C., feed rate 25 rpm, aspirator 1800 rpm, Vacuum 180 mm Hg. The obtained solid was dried in Air Tray Dryer (ATD) at about 50° C. for about 105 min.

Example 29: Preparation of Amorphous Solid Dispersion of Tafamidis with Hydroxy Propyl Methyl Cellulose Acetate Succinate (HPMC-AS)

Tafamidis (2 g) and hydroxy propyl methyl cellulose-acetate succinate (HPMC-AS) (2 g) were dissolved in 15% methanol in tetrahydrofuran solvent mixture (250 mL). The mixture was heated to about 55-60° C. to obtain clear solution and filtered through hyflo for particle free solution. The solvent was removed from the obtained solution by spray dryer. Carrier nitrogen flow 1.0 Kg/cm$^2$, inlet temperature 70° C., outlet temperature 45° C., feed rate 25 rpm, aspirator 1800 rpm, Vacuum 190 mm Hg. The obtained solid was dried in Air Tray Dryer (ATD) at about 50° C. for about 75 min.

Example 30: Preparation of Amorphous Solid Dispersion of Tafamidis with Polyvinyl Acetate Phthalate (PV-AP)

Tafamidis (2 g) and polyvinyl acetate phthalate (PV-VA) (2 g) were dissolved in 30% methanol in tetrahydrofuran solvent mixture (100 mL). The mixture was heated to about 50-55° C. to obtain clear solution and filtered through hyflo for particle free solution. The solvent was removed from the obtained solution by Spray dryer. Carrier nitrogen flow 1.0 Kg/cm$^2$, inlet temperature 70° C., outlet temperature 45° C., feed rate 25 rpm, aspirator 1800 rpm, Vacuum 190 mm Hg. The obtained solid was dried in Air Tray Dryer (ATD) at about 50-55° C. for about 45 min.

Example 31: Preparation of Amorphous Solid Dispersion of Tafamidis with Polyvinyl Pyrrolidone (PVP K30)

Tafamidis (2 g) and polyvinyl pyrrolidone K30 (2 g) were dissolved in 30% methanol in tetrahydrofuran solvent mixture (100 mL). The mixture was heated to about 55-60° C. to obtain clear solution, filtered through hyflo for particle free solution and washed with 30% methanol (10 mL) in Tetrahydrofuran solvent mixture. The solvent was removed from the obtained solution by Spray dryer. Carrier nitrogen flow 1.0 Kg/cm$^2$, inlet temperature 60° C., outlet temperature 45° C., feed rate 22 rpm, aspirator 1800 rpm, Vacuum 190-200 mm Hg. The obtained solid was dried in Air Tray Dryer (ATD) at about 55° C. for about 90 min.

Example 32: Preparation of Tafamidis Form 4

To a mixture of 4-(3,5-dichlorobenzamido)-3-hydroxybenzoic acid (10 g) in dimethylacetamide (20 mL) and toluene (180 mL) was added triethylamine (3.4 g). The reaction mixture was stirred at about 20-25° C. for about 1 hr and filtered to remove any insoluble particles. Methanesulfonic acid (4.71 g) was added to the filtrate. The reaction mixture was heated to about 115-120° C. and the clear solution was refluxed at about 115-120° C. for about 18-22 hr. The reaction mixture was cooled to about 60° C. and tetrahydrofuran (200 mL) was added at about 50-60° C. to the clear solution. The mixture was cooled to about 40-45° C., water (100 mL) was added and further cooled to about 25-30° C. The two layers were separated and dimethyl acetamide was added to the organic layer. The solution was distilled under high vacuum at about 65-70° C. The obtained solid was dried under vacuum for about 1 hr at about 65-70° C. to obtain tafamidis Form 4.

Example 33: Preparation of Tafamidis Form 4

To a mixture of Tafamidis morpholine salt (5 g) in tetrahydrofuran, dimethyl acetamide (10 mL) and toluene (90 mL) was added methanesulphonic acid (1.56 g) and stirred for about 15 min. Water (50 mL) was charged and stirred for about 15 min. Two layers were separated and organic layer was washed with 10% sodium chloride (50 mL) solution. Dimethyl acetamide (35 mL) was charged to organic layer and tetrahydrofuran/toluene solvent mixture was distilled off under reduced pressure at about 55-60° C. to obtain clear solution. The solution was cooled at about 25-30° C., filtered through hyflow and washed with dimethyl acetamide (5 mL). The clear solution was added to water (120 mL) at about 25-30° C. for about 15-20 min. The precipitated solid was stirred for about 2 hr, filtered and washed with water. The wet material was suck dried under vacuum for about 10-15 min and then dried in Air Tray Drier (ATD) for about 12 hr at about 50-55° C. to obtain tafamidis Form-4. Yield: 2.50 g (64.26%), Purity: 99.79%.

Example 34: Preparation of Tafamidis Form 4

To a mixture of tafamidis morpholine salt (5 g) in dimethyl acetamide (50 mL), was added methanesulphonic acid (1.33 g) and stirred for about 15 min. The clear solution was cooled at about 15-20° C. for 15-20 min. The reaction mass was warmed at about 25-30° C. and stirred for about 30-40 min. The solution was filtered through hyflow and washed with dimethyl acetamide (5 mL). The clear solution was added to water (165 mL) at about 25-30° C. for about 25-30 min. The precipitated solid was stirred for about 2 hr, filtered and washed with water. The wet material was suck dried under vacuum for about 10-15 min and then dried in Air Tray Drier (ATD) for about 12 hr at about 50-55° C. to obtain tafamidis Form-4. Yield: 2.0 g (51.41%).

Example 35: Preparation of Tafamidis Form 4

To a mixture of Tafamidis morpholine salt (5 g) in dimethyl acetamide (60 mL) was added acetic acid (1 g) and stirred for about 90 min. The slurry was heated at about 70-80° C. and stirred for about 10-15 min. The reaction mass was cooled at about 25-30° C. and stirred for about for 10-15 min. The insoluble material was filtered and washed with dimethylacatamide (5 mL). The clear solution was added to water (195 mL) at about 25-30° C. for about 20-30 min. The precipitated solid was stirred for about 2 hr, filtered and washed with water. Wet material was suck dried under vacuum for about 10-15 min and then dried in Air Tray Drier (ATD) for about 12 hr at about 50-55° C. to obtain tafamidis Form 4. Yield: 0.5 g Example 36: Preparation of Tafamidis To a mixture of 4-(3,5-dichlorobenzamido)-3-hydroxybenzoic acid (2.5 g) in dimethyl acetamide (5 mL) and toluene (40 mL) was added triethylamine (0.85 g) and toluene (5 mL). The mixture was stirred at about 20-25° C. for about 1 hr and filtered to remove any insoluble particles. Methane sulfonic acid (1.17 g) was added to the filtrate. The reaction mass was heated to about 115-120° C. and refluxed at about 115-120° C. for about 24 hr. The clear solution was cooled to about 90-80° C. and activated carbon was added. The reaction mass was stirred for about 15 min, cooled to about 40-45° C., filtered through hyflo and washed with tetrahydrofuran. Tetrahydrofuran and water were added to the filtrate and stirred for about 15 min. The two layers were separated and dimethyl acetamide was added to the organic layer. The solution was distilled under high vacuum at about 65-70° C. to obtain tafamidis dimethyl acetamide solution.

Example 37: Preparation of Tafamidis Form-4

Tafamidis dimethyl acetamide solution (4.7 g) (obtained from Example 36) was added to water (15 mL) at about 20-25° C., stirred the precipitated solid for about 3 hr and filtered. Wet material was suck dried under vacuum and then dried in Air Tray Drier (ATD) for about 18 hr at about 50-55° C. to obtain tafamidis Form-4.

Example 38: Preparation of Tafamidis Form-4

Tafamidis dimethyl acetamide solution (4.7 g) (obtained from Example 36) was added to isopropyl alcohol (15 mL) at about 20-25° C., stirred the precipitated solid for about 1 hr and filtered. Wet material was suck dried under vacuum and then dried in Air Tray Drier (ATD) for about 18 hr at about 50-55° C. to obtain tafamidis Form-4. Purity: 99.63%.

Example 39: Preparation of Tafamidis Form-4

Tafamidis dimethyl acetamide solution (4.7 g) (obtained from Example 36) was added to isopropyl alcohol (11.25 mL) and water (3.75 mL) at about 20-25° C., stirred the precipitated solid for about 5 hr and filtered. Wet material was suck dried under vacuum and then dried in Air Tray Drier (ATD) for about 18 hr at about 50-55° C. to obtain tafamidis Form-4. Purity: 99.63%

Example 40: Preparation of Tafamidis Form-4

Tafamidis dimethyl acetamide solution (4.7 g) (obtained from Example 36) was added to isopropyl alcohol (7.5 mL) and water (7.5 mL) at about 20-25° C., stirred the precipitated solid for about 5 hr and filtered. Wet material was suck dried under vacuum and then dried in Air Tray Drier (ATD) for about 18 hr at about 50-55° C. to obtain tafamidis Form-4. Purity: 99.59%. Characteristic XRPD of tafamidis Form 4 obtained is same as FIG. 1.

Example 41: Preparation of Tafamidis Form-4

Tafamidis dimethyl acetamide solution (10 mL) (obtained from Example 36) was added to isopropyl alcohol (9.6 mL) and water (20.4 mL) at about 20-25° C., stirred the precipitated solid for about 5 hr and filtered. Wet material was suck dried under vacuum and then dried in Air Tray Drier (ATD) for about 18 hr at about 50-55° C. to obtain tafamidis Form-4.

Example 42: Preparation of Tafamidis Form-4

Tafamidis dimethyl acetamide solution (3.471 g) (obtained from Example 36) was added to isopropyl alcohol (2.62 mL) and water (78.75 mL) at about 20-25° C., stirred the precipitated solid for about 1 hr and filtered. Wet material was suck dried under vacuum and then dried in Air Tray Drier (ATD) for about 18 hr at about 50-55° C. to obtain tafamidis Form-4.

Example 43: Preparation of Tafamidis Form-4

A mixture of tafamidis dimethyl acetamide solution (3.47 g) (obtained from Example 36) and tetrahydrofuran (3.5 mL) was added in water (105 mL) at about 20-25° C., stirred the precipitated solid for about 1 hr and filtered. Wet material was suck dried under vacuum and then dried in Air Tray Drier (ATD) for about 18 hr at about 50-55° C. to obtain tafamidis Form-4.

Example 44: Preparation of Tafamidis Form-4

To a mixture of 4-(3,5-dichlorobenzamido)-3-hydroxybenzoic acid (12 g) in dimethyl acetamide (24 mL) and toluene (216 mL) was added triethylamine (4.09 g) in toluene (24 mL). The reaction mixture was stirred at about 20-25° C. for about 1 hr and filtered to remove any insoluble particles. Methane sulfonic acid (5.65 g) was added to the filtrate and reaction mass was heated to about 115-120° C., refluxed for about 24 hr. The clear solution was cooled to about 90-80° C. and activated carbon was added, stirred for about then cooled to about 40-45° C. The reaction mass was filtered through hyflo and washed with tetrahydrofuran (96 mL). Tetrahydrofuran (144 mL) and water (120 mL) was added to filtrate and stirred for about 15 min. The two layers were separated and dimethyl acetamide (120 mL) was added to the organic layer. Tetrahydrofuran and toluene was distilled off from the solution under high vacuum at about 60-65° C. to obtain tafamidis dimethyl acetamide solution (120 mL). Tafamidis dimethyl acetamide solution (120 mL) was added to a solvent mixture of isopropyl alcohol (180 mL) and water (180 mL) at about 20-25° C. and stirred the precipitated solid for about 3 hr. The solid was filtered and washed with solvent mixture of isopropyl alcohol and water. The wet material was suck dried under vacuum and obtained solid was dried in Air Tray Drier (ATD) for about 18 hr at about 50-55° C. to obtain tafamidis Form-4 (9.5 g). Purity: 99.60%.

Example 45: Preparation of Tafamidis Form-4

Tafamidis Form-4 (6 g) (obtained from Example 44) was dissolved in dimethyl acetamide (60 mL) at about 55-60° C. The clear solution was filtered through hyflo for particle free solution. Tafamidis dimethyl acetamide clear solution was added to solvent mixture of water (90 mL) and isopropyl alcohol (90 mL) at about 20-25° C. in about 1-2 hr. The precipitated solid was stirred for about 3 hr, filtered and washed with solvent mixture isopropyl alcohol and water. The wet material was suck dried under vacuum and obtained solid was dried in Air Tray Drier (ATD) for about 18 hr at about 50-55° C. to obtain tafamidis Form-4 (5.2 g). Purity: 99.88%.

Example 46: Preparation of Tafamidis-Meglumine Salt

Tafamidis Form-4 (2.5 g) and N-Methyl-D-glucamine (meglumine) (1.58 g) were added to solvent mixture of isopropyl alcohol (49 mL) and water (13.8 mL) at about 25° C. The clear solution was observed after stirring for about 5 min and precipitation was observed after about 5 min. The solution was heated at about 70° C., and observed clear solution, further heated to about 79° C., stirred for about 5 min and filtered. The solution was gradually cooled to about 25-30° C., precipitation was started at about 50-55° C., further cooled to about 10° C. and maintained for about 1 hr. The solid was filtered and washed with isopropyl alcohol. The wet material was suck dried under vacuum and obtained solid was dried in Air Tray Drier (ATD) for about 21 hr at about 50-55° C. to obtain tafamidis-meglumine salt (3.33 g).

Example 47: Preparation of Tafamidis Form-4

To a mixture of 4-(3,5-dichlorobenzamido)-3-hydroxybenzoic acid (10 g) in dimethyl acetamide (50 mL) and toluene (100 mL) was added triethylamine (3.40 g). The reaction mixture was stirred at about 20-25° C. for about 1 hr. Methane sulfonic acid (4.72 g) was added to the reaction mass and reaction mass was heated to reflux at about 120-130° C. After the reaction was complete, clear solution was cooled to about 90-80° C. and activated carbon (12 g) was added, stirred for about 15 min, then cooled to about 40-45° C. The reaction mass was filtered through hyflo and washed with dimethyl acetamide. (50 mL). Toluene was distilled off from the solution at high vacuum at about 60-65° C. to obtain tafamidis dimethyl acetamide solution (100 mL). Tafamidis dimethyl acetamide solution was added to a anti-solvent mixture of isopropyl alcohol (150 mL) and water (150 mL) at about 20-25° C. and stirred the precipitated solid for about 3 hr. The solid was filtered and wet material was suck dried under vacuum. The obtained solid was dried in Air Tray Drier (ATD) for about 18 hr at about 50-55° C. to obtain tafamidis Form-4 (Yield 75.53%). Purity: 99.09%

Example 48: Preparation of 4-(3,5-dichlorobenzamido)-3-hydroxybenzoic Acid

To a solution of 3,5-Dichlorobenzoic acid (4.05 g) in toluene (20 mL) and dimethylformamide (0.1 mL) was added thionyl chloride (3.30 g). The reaction mass was heated at about 60-70° C. for about 2 hr and cooled to about 45-50° C. Toluene was distilled off by vacuum at about 60° C. for about 1 hr to obtain 3,5-dichlorobenzoyl chloride compound as an oil.

4-Amino-3-hydroxybenzoic acid (2.5 g) was dissolved in a mixture of tetrahydrofuran (25 mL) and water (4.75 mL) at about 20° C. 3,5-dichlorobenzoyl chloride was dissolved in tetrahydrofuran (5 mL), added to the reaction mass at about 15-20° C. and stirred for about 1 hr at about 15-20° C. Triethylamine (1.98 g) was added, heated to about 35-40° C. and stirred for about 1.5 hr. The reaction mass was cooled and charged with water and ethanol. The reaction mass was stirred, filtered under vacuum, obtained solid was washed with ethanol and dried under vacuum at about 55-60° C. for about 12 hr to obtain title compound (4.1 g). Yield: 77.63%. Purity: 99.65%

Example 49: Preparation of Tafamidis Form-4

To a mixture of 4-(3,5-Dichlorobenzamido)-3-hydroxybenzoic acid (2.0 g) in dimethyl acetamide (4 mL) and toluene (36 mL) was added triethylamine (0.68 g), reaction mixture was stirred at about 20-25° C. for about 1 hr. Methane sulfonic acid (0.94 g) was added and reaction mass was heated to about 110-120° C., refluxed for about 24 hr. The clear solution was cooled to about 60-65° C., activated carbon (g) and dimethyl acetamide (2 mL) was added, stirred for about 15 min and cooled to about 45-55° C. The reaction mass was filtered through hyflo and washed with tetrahydrofuran. Tetrahydrofuran (30 mL) and water (20 mL) was added to the filtrate and stirred for about 15 min, two layers were separated and dimethylacetamide (20 mL) was added to organic layer. Tetrahydrofuran and toluene was distilled off from the solution under high vacuum at about 60-65° C. to obtain tafamidis dimethyl acetamide solution (20 mL). Tafamidis dimethyl acetamide solution was filtered through hyflo, washed with dimethyl acetamide. Tafamidis dimethyl acetamide solution was added to a solvent mixture of isopropyl alcohol and water at about 15-20° C. and stirred the precipitated solid for about 2 hr. The slurry was filtered, washed with solvent mixture of isopropyl alcohol and water. The wet material was suck dried under vacuum and in Air Tray Drier (ATD) for about 18 hr at about 50-55° C. to obtain Tafamidis Form-4 (1.64 g). Purity: 99.60%

Example 50: Preparation of Tafamidis Form 4

Tafamidis (14 g) was dissolved in dimethyl sulfoxide (154 mL) at about 60° C. The clear solution was filtered through hyflo and washed with dimethyl sulfoxide (14 mL) for particle free solution. The clear solution was added to a solvent mixture of isopropyl alcohol and water at about 15-20° C. The slurry was maintained for about 1 hr, filtered and suck dried under vacuum. The obtained solid was dried in Air Tray Drier (ATD) for about 8 hr at about 50-55° C. and then for about 12 hr at about 70-75° C. to obtain tafamidis Form-4. Yield: 12.23 g (87%).

The crystalline Form 4 of tafamidis has no detectable quantity of Form 1 as determined by absence of characteristic peak reflections at about 20.2±0.2 degrees 2 theta.

Stability data of crystalline Form 4 of tafamidis prepared by the present invention at periodic intervals:

| Storage Conditions | Polymorphic form | Time | | | |
|---|---|---|---|---|---|
| | | 15 days | 1 month | 2 months | 3 months |
| 25° C. | Form 1 | ND | ND | ND | ND |
| 40° C. at 75% RH | | ND | ND | ND | ND |

ND-not detected

Example 51: Preparation of Tafamidis Meglumine (Form-M)

To a mixture of 4-(3,5-Dichlorobenzamido)-3-hydroxybenzoic acid (15 g) in dimethyl acetamide (30 mL) and toluene (270 mL) was added triethylamine (5.11 g). The reaction mixture was stirred at about 20-25° C. for about 1 hr. Methane sulfonic acid (7.07 g) was added and reaction mass was heated to about 110-120° C., refluxed for about 24 hr. The clear solution was cooled to about 60-65° C. and activated carbon (1.5 g) and dimethyl acetamide (15 mL) was added, stirred for about 15 min, then cooled to about 40-45° C. The reaction mass was filtered through hyflo and washed with tetrahydrofuran. Tetrahydrofuran and water was added to filtrate and stirred for about 15 min, two layers were separated and dimethyl acetamide was added to the organic layer. D-Meglumine (8.97 g) was added and stirred for about 10-15 min. Tafamidis Meglumine (0.15 g) was seeded, solvent mixture of isopropyl alcohol and water was added. The slurry was stirred for about 1 hr, filtered and suck dried under vacuum. The slurry was filtered and washed with solvent mixture of isopropyl alcohol. The wet material was suck dried under vacuum and obtained solid was dried in Vacuum Tray Drier (VTD) for about 12 hr at about 55-60° C. to obtain Tafamidis Meglumine (19.95 g). Purity: 99.70%.

Example 52: Preparation of Tafamidis Meglumine (Form-M)

Tafamidis Meglumine (15 g) was added to solvent mixture of isopropyl alcohol (180 mL) and water (52.5 mL) at about 20-25° C. The solution was heated to about 70-80° C., clear solution obtained and stirred for about 10-15 min. The solution was cooled to about 65-70° C., filtered through suitable filter and washed with solvent mixture of isopropyl alcohol and water. The filtrate was heated to about 75-80° C. to obtain clear solution. The solution was gradually cooled to about 53-55° C. and seeded tafamidis meglumine (1.5 g), precipitation was started at about 50-55° C., cooled to about 25-30° C., further cooled to 10-15° C. and maintained for about 1 hr. The slurry was filtered and washed with isopropyl alcohol. The wet material was suck dried under vacuum and obtained solid was dried in Vacuum Tray Drier (VTD) for about 18 hr at about 55-60° C. to obtain Tafamidis-Meglumine salt (12 g).

Comparative Example

To a mixture of 4-(3,5-dichlorobenzamido)-3-hydroxybenzoic acid (8 g) in tetrahydrofuran (80 mL) was added triethylamine (2.72 g) and water (1.76 mL). The reaction mixture was stirred at about 20-25° C. for about 1 hr and filtered to remove any insoluble particles. Methane sulfonic acid (3.76 g) was added to the filtrate, slurry was formed and toluene (80 mL) was added to the slurry mass. Tetrahydrofuran/water with toluene was distilled off. After completion of distillation, toluene (80 mL) was added and reaction mass was refluxed for 24 hr. After completion of reaction, reaction mixture was cooled to about 25-30° C., filtered partly approximately 50 mL of slurry and dried to give Form 1 of tafamidis.

Isopropyl alcohol (30 mL) was added to the remaining slurry at about 20° C. and stirred for about 1 hr at about 15-20° C. The slurry was filtered, solid was washed with isopropyl alcohol and dried in air oven at about 55-60° C. to give Form 1 of tafamidis.

The invention claimed is:

1. A process for the preparation of crystalline Form 4 of tafamidis, the process comprising:
   (a) providing a solution of tafamidis in a solvent selected from the group consisting of $C_1$-$C_4$ amides, $C_2$-$C_3$ sulfoxides, $C_5$-$C_6$ pyrrolidones, and mixtures thereof; and
   (b) obtaining a crystalline Form 4 of tafamidis from the solution of step (a) by:
      (i) combining the solution of step (a) with an antisolvent selected from the group consisting of $C_1$-$C_8$ alcohols, $C_3$-$C_{10}$ ketones, $C_1$-$C_3$ nitriles, water and mixtures thereof; or
      (ii) removing the solvent from the solution of step (a), wherein the crystalline Form 4 of tafamidis is characterized by an X-ray powder diffraction (XRPD) pattern as illustrated in FIG. 1.

2. The process of claim 1, wherein the step (a) of providing the solution of tafamidis comprises reacting 4-(3,5-dichlorobenzamido)-3-hydroxybenzoic acid with a coupling agent in the solvent to obtain tafamidis, wherein the coupling agent is methanesulfonic acid.

3. The process of claim 1, wherein the step (a) of providing the solution of tafamidis comprises reacting a salt of tafamidis with an acid to obtain tafamidis.

4. The process of claim 2, wherein the solvent comprises an amide solvent selected from $C_1$-$C_4$ amides.

5. The process of claim 4, wherein the amide solvent is one or more of dimethylacetamide and dimethylformamide.

6. The process of claim 3, wherein the salt of tafamidis is a morpholine salt of tafamidis.

7. The process of claim 1, wherein the crystalline Form 4 of tafamidis obtained in step (b) contains less than about 0.5% w/w of crystalline Form 1 of tafamidis.

8. A process for the preparation of a salt of tafamidis, the process comprising:
   (a) reacting tafamidis with an inorganic base or an organic base to form a reaction mixture comprising the tafamidis salt; and
   (b) separating the tafamidis salt from the reaction mixture of the step (a), wherein the tafamidis of step (a) is obtained by reacting 4-(3,5-dichlorobenzamido)-3-hydroxybenzoic acid with methanesulfonic acid in an amide solvent.

9. The process of claim 8, further comprising the step of converting the obtained tafamidis salt to tafamidis comprising:
   (a) treating the tafamidis salt with an acid to obtain a reaction mixture; and
   (b) separating and isolating the tafamidis obtained in step (a),
   wherein the tafamidis obtained is amorphous or crystalline.

10. The process of claim 8, wherein the amide solvent is selected from $C_1$-$C_4$ amides.

11. The process of claim 8, wherein the tafamidis obtained is not isolated from the reaction mixture and is reacted with the inorganic base or the organic base to form the tafamidis salt.

12. The process of claim 11, wherein the organic base is morpholine.

13. The process of claim 8, wherein the tafamidis obtained from the reaction mixture is crystalline Form 4 of tafamidis by any one of the following:
   (i) combining the reaction mixture with an alcohol, water or mixture thereof; or
   (ii) removing the amide solvent from the reaction mixture.

\* \* \* \* \*